US009124372B2

(12) United States Patent
Shibutani

(10) Patent No.: US 9,124,372 B2
(45) Date of Patent: Sep. 1, 2015

(54) OPTICAL TRANSMISSION SYSTEM AND OPTICAL TRANSMISSION METHOD

(71) Applicant: NEC Corporation, Tokyo (JP)

(72) Inventor: Makoto Shibutani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 20 days.

(21) Appl. No.: 14/056,803

(22) Filed: Oct. 17, 2013

(65) Prior Publication Data

US 2014/0112664 A1   Apr. 24, 2014

(30) Foreign Application Priority Data

Oct. 19, 2012   (JP) .................................. 2012-231863

(51) Int. Cl.
H04J 14/06 (2006.01)
H04J 14/00 (2006.01)
H04B 10/532 (2013.01)

(52) U.S. Cl.
CPC .................................... H04B 10/532 (2013.01)

(58) Field of Classification Search
CPC ....... H04J 14/06; H04J 14/005; H04J 14/007; H04B 10/516; H04B 10/532; H04L 2012/5672
USPC ..................... 398/65, 77, 152, 161, 183–185; 370/517, 519
See application file for complete search history.

(56) References Cited

U.S. PATENT DOCUMENTS

| 5,253,097 | A | * | 10/1993 | Naito et al. .................... 398/205 |
| 5,844,907 | A | * | 12/1998 | Uchiki et al. .................. 370/517 |
| 2004/0227649 | A1 | * | 11/2004 | Mauro et al. ..................... 341/69 |
| 2005/0185968 | A1 | * | 8/2005 | Dorrer et al. ................... 398/188 |
| 2005/0286908 | A1 | * | 12/2005 | Way .............................. 398/186 |
| 2009/0022498 | A1 | * | 1/2009 | Shibutani ....................... 398/152 |
| 2009/0067560 | A1 | * | 3/2009 | Iwamura et al. ............... 375/362 |
| 2011/0217040 | A1 | | 9/2011 | Mori |
| 2013/0272721 | A1 | * | 10/2013 | van Veen et al. ............... 398/202 |

FOREIGN PATENT DOCUMENTS

| JP | 61-280136 (A) | 12/1986 |
| JP | 2009-27525 A | 2/2009 |
| JP | 2010-50735 A | 3/2010 |
| JP | 2011-188044 A | 9/2011 |

* cited by examiner

Primary Examiner — Ken Vanderpuye
Assistant Examiner — Abbas H Alagheband
(74) Attorney, Agent, or Firm — McGinn IP Law Group, PLLC

(57) ABSTRACT

An optical transmission system 1 includes an optical transmitter 10 and an optical receiver 200. The optical transmitter 10 includes, a multiplexed code sequence generation unit 90a arranged to multiplex a code included in the transmission code sequence to be time shifted, and an optical transmission unit 90b that converts a multiplexed code sequence into a light signal and transmit it. The optical receiver 200 includes, an optical reception unit 240 that receives and converts the light signal transmitted from the optical transmitter 10 into a code sequence, and a transmission code sequence regeneration unit 380 that regenerates the transmission code sequence by identifying a code based on a value of a plurality of codes each corresponding to one another included in the code sequence.

14 Claims, 10 Drawing Sheets

OPTICAL TRANSMISSION SYSTEM AND OPTICAL TRANSMISSION METHOD

INCORPORATION BY REFERENCE

This application is based upon and claims the benefit of priority from Japanese patent application No. 2012-231863, filed on Oct. 19, 2012, the disclosure of which is incorporated herein in its entirety by reference.

BACKGROUND OF THE INVENTION

1. Technical Field

The present invention relates to an optical transmission system and an optical transmission method.

2. Background Art

In recent years, optical transmission and reception systems for transmitting and receiving transmission code sequences, or the like, at high speed by using optical transmission lines are being developed.

The orthogonal polarization multiplexing and digital coherent reception method have received attention as technology to utilize the optical transmission and reception system.

The orthogonal polarization multiplexing is a method utilizing the property of light as an electromagnetic wave and multiplexing a signal channel by utilizing polarization. To be more specific, since light includes a transverse wave which includes two polarized components that are orthogonal with respect to the direction of the light, the orthogonal polarization multiplexing multiplexes the two polarized components by adding independent information thereto in order to transmit a larger amount of information.

The digital coherent reception method is a method applying a digital signal processing on a coherent optical communication technology. For example, a reception side receives information by using a beat signal generated from the interference between a transmitted light signal and a local oscillator.

In Japanese Unexamined Patent Application Publication No. 2011-188044, an optical transmission system, in which a signal is transmitted upon separating an X polarized signal and a Y polarized signal from one another, is disclosed. Further, according to such system, of the two polarized signals, a determination is made as to which is the X polarized signal or the Y polarized signal.

In Japanese Unexamined Patent Application Publication No. 2009-027525, an optical transmission system is disclosed in which, at a transmission device a light signal is phase modulated and directions of adjacent bits are orthogonalized, whereas at a reception device, a light signal and another light signal which is delayed by an even number worth are made to interfere with one another in order to perform a delay detection.

In Japanese Unexamined Patent Application Publication No. 2010-050735, a differential phase shift keying optical transmission system is disclosed. According to such system, by synthesizing slots of two adjacent pulses having the same polarization state even when light pulses partially overlap with one another no bit error would occur.

In Japanese Unexamined Patent Application Publication No. 61-280136, a digital communication device which improves the code error rate using a DSK method is disclosed.

SUMMARY

However, when using a coherent light in the optical transmission line, the transmission performance may be compromised due to deterioration such as the influence of non-linear optical effect due to adjacent channel which may occur with time. There is a demand for an optical system which minimizes the deterioration related to the non-linear optical effect while allowing the same reception sensitivity as the original transmission code sequence were to be transmitted.

In order to achieve the aforementioned exemplary object, an optical transmission system according to the present invention includes an optical transmitter arranged to convert a transmission code sequence to a light signal and transmit the light signal; and an optical receiver arranged to receive the light signal and generate the transmission code sequence.

The optical transmitter includes, multiplexed code sequence generation unit arranged to multiplex a code included in the transmission code sequence to be time shifted, the transmission code sequence being converted by a predetermined conversion rule, or being unconverted to appear multiple times, an optical transmission unit arranged to convert a multiplexed code sequence generated at the multiplexed code sequence generation unit into a light signal and transmit the light signal. The optical receiver includes, an optical reception unit arranged to receive and convert the light signal transmitted from the optical transmitter into a code sequence, and a transmission code sequence regeneration unit arranged to regenerate the transmission code sequence by identifying a code based on a value of a plurality of codes each corresponding to one another included in the code sequence converted by the optical reception unit.

Furthermore, in order to achieve the aforementioned exemplary object, an optical transmission method according to the present invention is comprising a transmission step transmitting a light signal after converting a transmission code sequence into the light signal; and a reception step receiving the light signal and generating a transmission code sequence. The transmission step includes, multiplexing a code included in the transmission code sequence to be time shifted, the transmission code sequence being converted by a predetermined conversion rule, or being unconverted to appear multiple times, and converting a generated multiplexed code sequence into a light signal and transmitting the same. The reception step includes, receiving the transmitted light signal and converting the same into a code sequence, and regenerating a transmission code sequence by identifying a code included in the converted code sequence based on a value of a plurality of codes each corresponding to another.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENT

First Exemplary Embodiment

Figure 1:
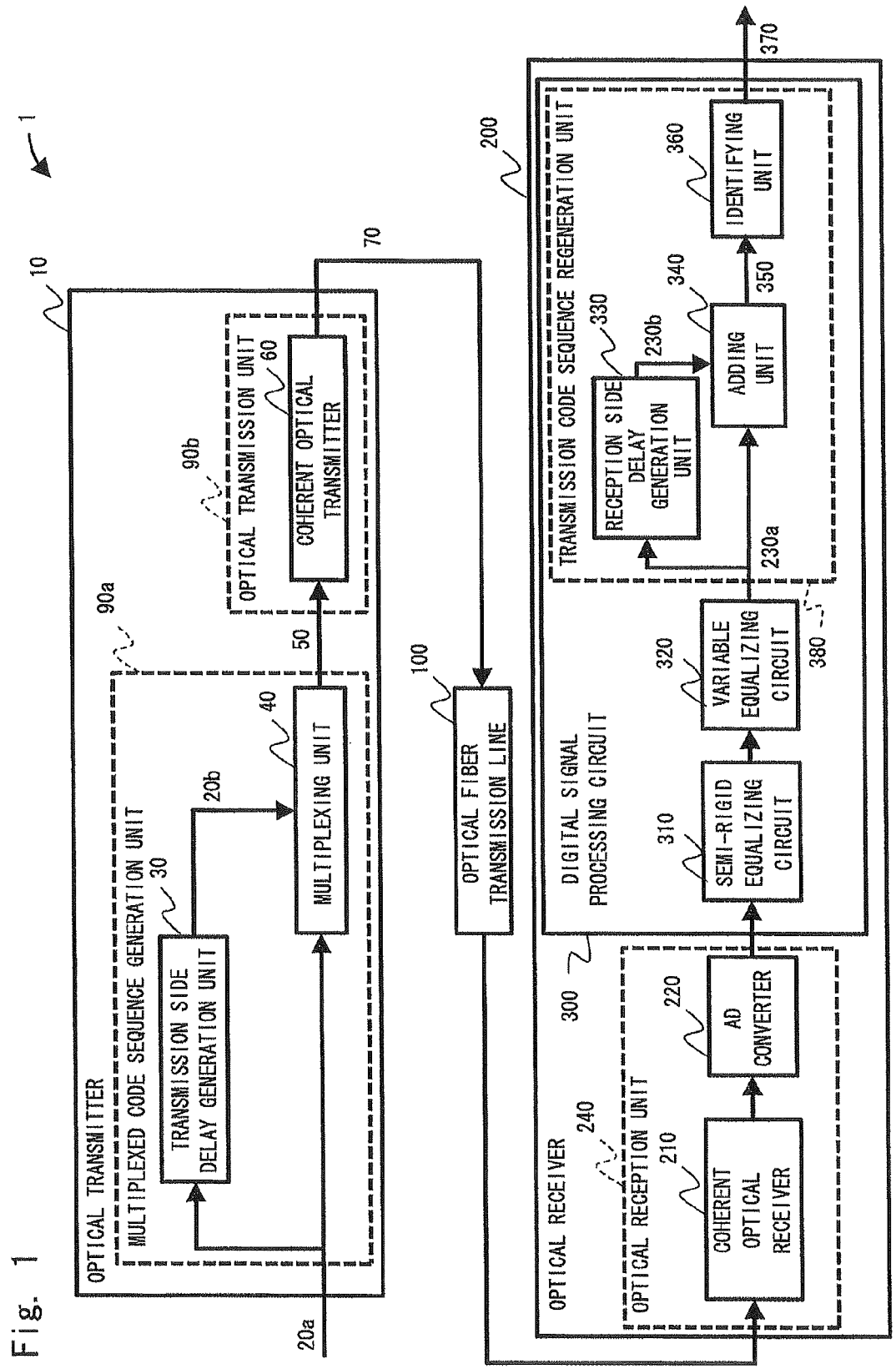
FIG. 1 illustrates a configuration of an optical transmission and reception system according to a first exemplary embodiment.

Hereinafter, an exemplary embodiment of the present invention will be described with reference to the drawings. FIG. 1 illustrates a configuration of an optical transmission and reception system 1. The optical transmission and reception system 1 includes an optical transmitter 10, an optical fiber transmission line 100 and an optical receiver 200.

The optical transmitter 10 includes a multiplexed code sequence generation unit 90a and an optical transmission unit 90b.

The multiplexed code sequence generation unit 90a includes a transmission side delay generation unit 30 and a multiplexing unit 40.

The transmission side delay generation unit 30 is a transmission code sequence generation unit arranged to generate a new transmission code sequence by adding a bit delay to a transmission code sequence inputted thereto. To be more specific, the transmission side delay generation unit 30 generates a transmission code sequence 20b by adding an M bit delay (M is a natural number) to a first transmission code sequence 20a inputted to the optical transmitter 10, and outputs the generated transmission code sequence 20b to the multiplexing unit 40.

The multiplexing unit 40 selects the first transmission code sequence 20a and the second transmission code sequence 20b alternately, and multiplexes the same in order to generate a multiplexed code sequence 50 which can be transmitted at double the code rate. To be more specific, the first transmission code sequence 20a, which is inputted to the optical transmitter 10, and the second code sequence 20b, which is outputted from the transmission side delay generation unit 30, are inputted to the multiplex unit 40. The multiplex unit 40 selects a code B from the first transmission code sequence 20a in order to generate a code B0. Next, the multiplexing unit 40 selects a code A from the second transmission code sequence 20b in order to generate A1. Here, the code B and the code B0 are the same code, while the code A and the code A1 are the same code. The multiplexing unit 40 arranges the code B0 and the code A1 in time series in order to generate a multiplexed code sequence 50 which can be transmitted at a rate twice as fast as the first transmission code sequence 20a and the second transmission code sequence 20b. The multiplexing unit 40 outputs the multiplexed code sequence 50 to a coherent optical transmitter 60.

The optical transmission unit 90b includes the coherent optical transmitter 60.

The coherent optical transmitter 60 converts the multiplexed code sequence 50 inputted thereto into a light signal 70, and outputs the same. To be more specific, the coherent optical transmitter 60 converts the multiplexed code sequence 50 into the signal light 70, and transmits the same to the optical receiver 200 via the optical fiber transmission line 100.

The optical fiber transmission line 100 is a transmission path for the light signal 70, which is transmitted from the coherent optical transmitter 60 and received at the optical receiver 200.

The optical receiver 200 includes an optical reception unit 240 and a digital signal processing circuit 300.

The optical reception unit 240 includes a coherent optical receiver 210 and an analogue to digital converter 220 (hereinafter, AD converter 220).

The coherent optical receiver 210 converts the light signal 70, which is received from the coherent optical transmitter 60, into an electrical signal. Further, the coherent optical receiver 210 outputs the electrical signal, which is generated by converting the light signal 70, to the AD converter 220. Here, the electrical signal generated at the coherent optical receiver 210 is an analogue signal.

The AD converter 220 converts the electrical signal, which is the analogue signal inputted thereto from the coherent optical receiver 210, into a digital signal. The AD converter 220 outputs the digitalized signal to the digital signal processing circuit 300.

The digital signal processing circuit 300 includes a semi-rigid equalizing circuit 310, a variable equalizing circuit 320, and a transmission code sequence regeneration unit 380.

The semi-rigid equalizing circuit 310 compensates the light signal 70 for chromatic dispersion when the same is transmitted via the optical fiber transmission line 100. To be more specific, the semi-rigid equalizing circuit 310 compensates a first received signal 230a, which is inputted thereto from the AD converter 220, such that the signal is in a state unaffected by chromatic dispersion. The semi-rigid equalizing circuit 310 outputs the compensated signal to the variable equalizing circuit 320.

The variable equalizing circuit 320 compensates for polarization fluctuation and chromatic dispersion. To be more specific, the variable equalizing circuit 320 generates the first received signal 230a by compensating the signal, which is inputted thereto from the semi-rigid equalization circuit 310, for polarization fluctuation and chromatic dispersion, and outputs the same to a reception side delay generation unit 330 and an adding unit 340.

The transmission code sequence regeneration unit 380 includes the reception side delay generation unit 330, the adding unit 340, and an identifying unit 360.

The reception side delay generation unit 330 is a circuit arranged to add a delay to signals inputted thereto. To be more specific, the reception side delay generation unit 330 generates a delayed reception signal by adding an N bit delay (N is a natural number) to the first received signal 230a, which is inputted thereto from the variable equalizing circuit 320. Here, the delayed reception signal will be referred to as a second received signal 230b. The reception side delay generation unit 330 outputs the second received signal 230b to the adding unit 340.

The adding unit 340 adds the two signals inputted thereto. To be more specific, the adding unit 340 adds the first received signal 230a, which is inputted thereto from the variable equalizing circuit 320, and the second received signal 230b, which is inputted thereto from the reception side delay generation unit 330, in order to generate a sum signal 350. The adding unit 340 outputs the sum signal 350 to the identifying unit 360.

The identifying unit 360 identifies, out of the sum signal 350 inputted thereto from the adding unit 340, bits of codes which are generated from the same codes added to one another, and outputs the identified bits of codes as a transmission code sequence 370.

Next, an operation of the optical transmission and reception system 1 will be described. Firstly, an operation of the optical transmitter 10, which is at a transmitter side of signals, will be described.

Figure 2:
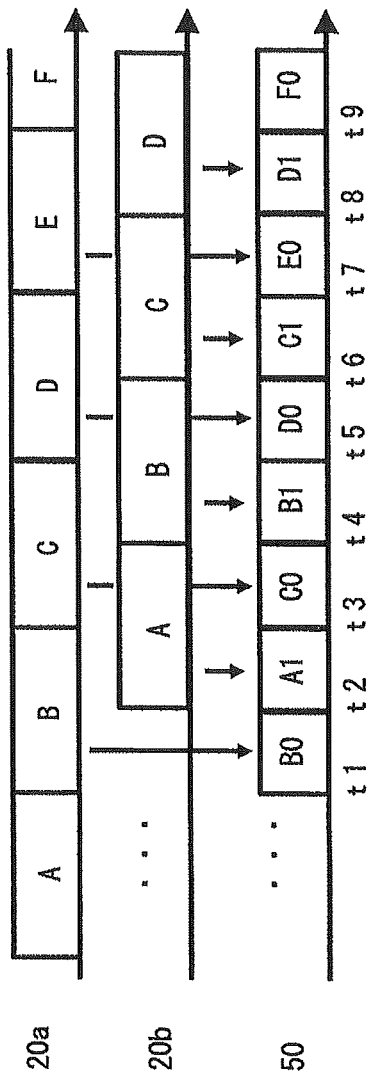
FIG. 2 illustrates a code sequence of an optical transmission and reception system according to a first exemplary embodiment.

FIG. 2 is a schematic view illustrating the multiplexing unit 40 generating the multiplexed code sequence 50 from the first transmission code sequence 20a and the second transmission code sequence 20b.

The first transmission code sequence 20a is split into two, and inputted, respectively, into the transmission side delay generation unit 30 and the multiplexing unit 40 in the optical transmitter 10.

The transmission side delay generation unit 30 generates the second transmission code sequence 20b by adding the M bit delay to the first transmission code sequence 20a, and outputs the same to the multiplexing unit 40. Note that the first transmission code sequence 20a and the second transmission code sequence 20b each include codes A, B, C and so forth, where each code is 1 bit. It is to be noted that in the description herein the transmission side delay generation unit 30 adds a 1.5 bit delay to the first transmission code sequence 20a in order to generate the second transmission code sequence 20b.

The multiplexing unit 40 generates the multiplexed code sequence 50 by multiplexing the first transmission code sequence 20a and the second transmission code sequence 20b, and outputs the same to the coherent optical transmitter 60.

To be more specific, for an interval between t1 and t2, the multiplexing unit 40 selects the code B from the first transmission code sequence 20a. Further, for an interval between t2 and t3, the multiplexing unit 40 selects the code A from the second transmission code sequence 20b. At this point, for the interval between t1 and t2, the multiplexing unit 40 outputs the code B0 as the multiplexed code sequence 50. Further, for the interval between t2 and t3, the multiplexing unit 40 outputs the code A1 as the multiplexed code sequence 50.

Next, for an interval between t3 and t4, the multiplexing unit 40 selects a code C form the first transmission code sequence 20a.

For the interval between t3 and t4, the multiplexing unit 40 outputs the code C0 as the multiplexed code sequence 50.

Next, for an interval between t4 and t5, the multiplexing unit 40 selects the code B from the second transmission code sequence 20b. For an interval between t4 and t5, the multiplexing unit 40 outputs the code B1 as the multiplexed code sequence 50. Note that the code B0 and B1 are the same code.

As the above described process continues, every third bit of the multiplexed code sequence 50 is generated from the same code.

The coherent optical transmitter 60 converts the multiplexed code sequence 50 into the light signal 70, and transmits the same to the optical receiver 200 via the optical fiber transmission line 100. For example, when a value of a code recorded in the multiplexed code sequence 50 is 0, the multiplexed code sequence 50 transmits a waveform having an amplitude of 0, and when a value of a code recorded in the multiplexed code sequence 50 is 1, the multiplexed code sequence 50 transmits a waveform having an amplitude of 10.

Figure 3:
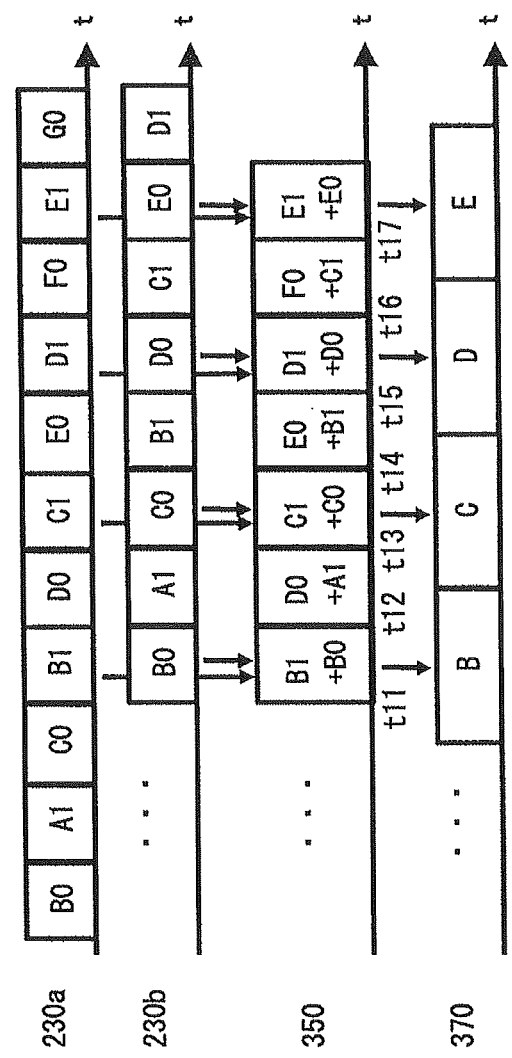
FIG. 3 illustrates a code sequence of an optical transmission and reception system according to a first exemplary embodiment.

Next, an operation of the optical receiver 200, which is on a reception side of signals, will be described. FIG. 3 is a schematic view illustrating the transmission code sequence 370 being generated after the sum signal 350 is generated from the first received signal 230a and the second received signal 230b.

The coherent optical receiver 210 converts the light signal 70, received from the coherent optical transmitter 60, into an analogue signal, and outputs the same to the AD converter 220.

The AD converter 220 converts the analogue signal, inputted thereto from the coherent optical receiver 210, into a digital signal, and outputs the same to the semi-rigid equalizing circuit 310. Here, assuming that noise, whose amplitude is as large as 5, is added to the signal in the optical fiber transmission line 100, the amplitude of the waveform indicating 0 will be between 0 to 5, and the amplitude of the waveform indicating 1 will be between 5 to 15. For example, the AD converter 220 quantizes the value of the amplitude of an analogue signal into a 16-degree scale (of 0 through 15) and outputs the outcome to the semi-rigid equalizing circuit 310.

The semi-rigid equalizing circuit 310 compensates the signal, which is inputted thereto from the AD converter 220, such that the signal is in a state unaffected by chromatic dispersion as the signal was when the same was transmitted via the optical fiber transmission line 100. The semi-rigid equalizing circuit 310 outputs the compensated signal to the variable equalizing circuit 320.

The variable equalizing circuit 320 generates the first received signal 230a by compensating the signal, which is inputted thereto from the semi-rigid equalizing circuit 310, for polarization fluctuation and polarization dispersion, and outputs the same to the reception side delay generation unit 330 and the adding unit 340.

The reception side delay generation unit 330 generates the second received signal 230b by adding an N bit delay to the first received signal 230a, which is inputted thereto from the variable equalizing circuit 320, and outputs the same to the adding unit 340. To be more specific, the reception side delay generation unit 330 generates the second received signal 230b by adding a 1.5 bit delay to the first received signal 230a since the delay added to the second transmission code sequence 20b at the transmission side delay generation unit 30 in the optical transmitter 10 is 1.5 bit.

The adding unit 340 adds the two signals inputted thereto. To be more specific, the adding unit 340 adds the first received signal 230a, inputted thereto from the variable equalizing circuit 320, and the second received signal 230b, inputted thereto from the reception side delay generation unit 330, in order to generate the sum signal 350, and outputs the same to the identifying unit 360.

To be more specific, when the adding unit 340 adds the first received signal 230a and the second received signal 230b inputted thereto, a bit of code generated from two codes from the same code added to one another and a bit of code generated from two different codes added to one another appear alternately.

For example, in FIG. 3, at an interval between t11 and t12, the code in the first received signal 230a is B1, and the code in the second received signal 230b is B0, where both B1 and B0 are generated from the same code. At this point, the sum signal 350 includes B1+B0. At an interval between t12 and t13, the code in the first received signal 230a is D0, and the code in the second received signal 230b is A1, where D0 and A1 are generated from different codes. At this point, the sum signal 350 includes D0+A1. Further, at an interval between t13 and t14, the code in the first received signal 230a is C1, and the code in the second received signal 230b is C0, where C1 and C0 are generated from the same code. At this point, the sum signal 350 includes C1+C0.

The identifying unit 360 identifies, from the sum signal 350 inputted thereto from the adding unit 340, bits of signal codes which are generated by adding the same codes, and outputs the transmission code sequence 370. For example, the identifying unit 360 extracts, out of the sum signal 350, the bit having B1+B0, or the like, added. Then, the identifying unit 360, for example, generates a code B from the B1+B0, and transmits the same as the transmission code sequence 370. Typically, the identifying unit 360 extracts add numbered bits from the sum signal 350 in order to extract the bits including the codes which are generated from the same code added to one another.

Here, for example, when a quantized amplitude value of the code B1 is 11 and a quantized amplitude value of the code B0 is 8, B1 and B0 make 19. Based on an operation of the AD converter, since an amplitude of a waveform, when a code indicates 1, is between 5 through 15, by adding the amplitudes of B1 and B0, 10 through 30 will be the value indicating 1. Therefore, when B1 and B0 make 19, the identifying unit 360 generates the transmission code sequence 370 treating the code B as 1.

In a similar manner, since an amplitude of a waveform, when a code indicates 0, is between 0 through 5, by adding the two of the quantized values, 0 through 10 will be the value indicating 0. For example, when C1 and C0 make 6, the identifying unit 360 generates the transmission code sequence 370 treating the code C as 0.

Thus, according to the present digital coherent optical transmission method, since a transmission code sequence is transmitted upon being duplicated and time-multiplexed at the transmission side, various types of deterioration, such as the influence of nonlinear effects due to an adjacent channel, or the like, which may occur with time in the optical fiber transmission line can be dispersed. Since the influence of the nonlinear optical effect in the optical fiber transmission line is minimized, a maximum transmission distance for the optical transmission system utilizing dense wavelength division multiplexing can be further extended.

Since the code rate of the transmission signal is twice the original code rate of the transmission code sequence, the reception sensitivity may be decreased by 3 dB. However, since the identification process is carried out at the receiving side after the two series of received signals are added to one another, the reception sensitivity can be improved by 3 dB. Thus, the present system allows the same level of reception sensitivity as when the original transmission code sequence was to be transmitted.

Note that although it is described in the present exemplary embodiment that the second transmission code sequence 20b is generated by adding a delay of 1.5 bit to the first transmission code sequence 20a, the present invention is not limited thereto. The delay added to the second transmission code sequence 20b may be 2.5 or 3.5 bits. In other words, the M bit delay added at the transmission side delay generation unit 30 can be stated as M=k+0.5 (k is a natural number).

Second Exemplary Embodiment

Figure 4:
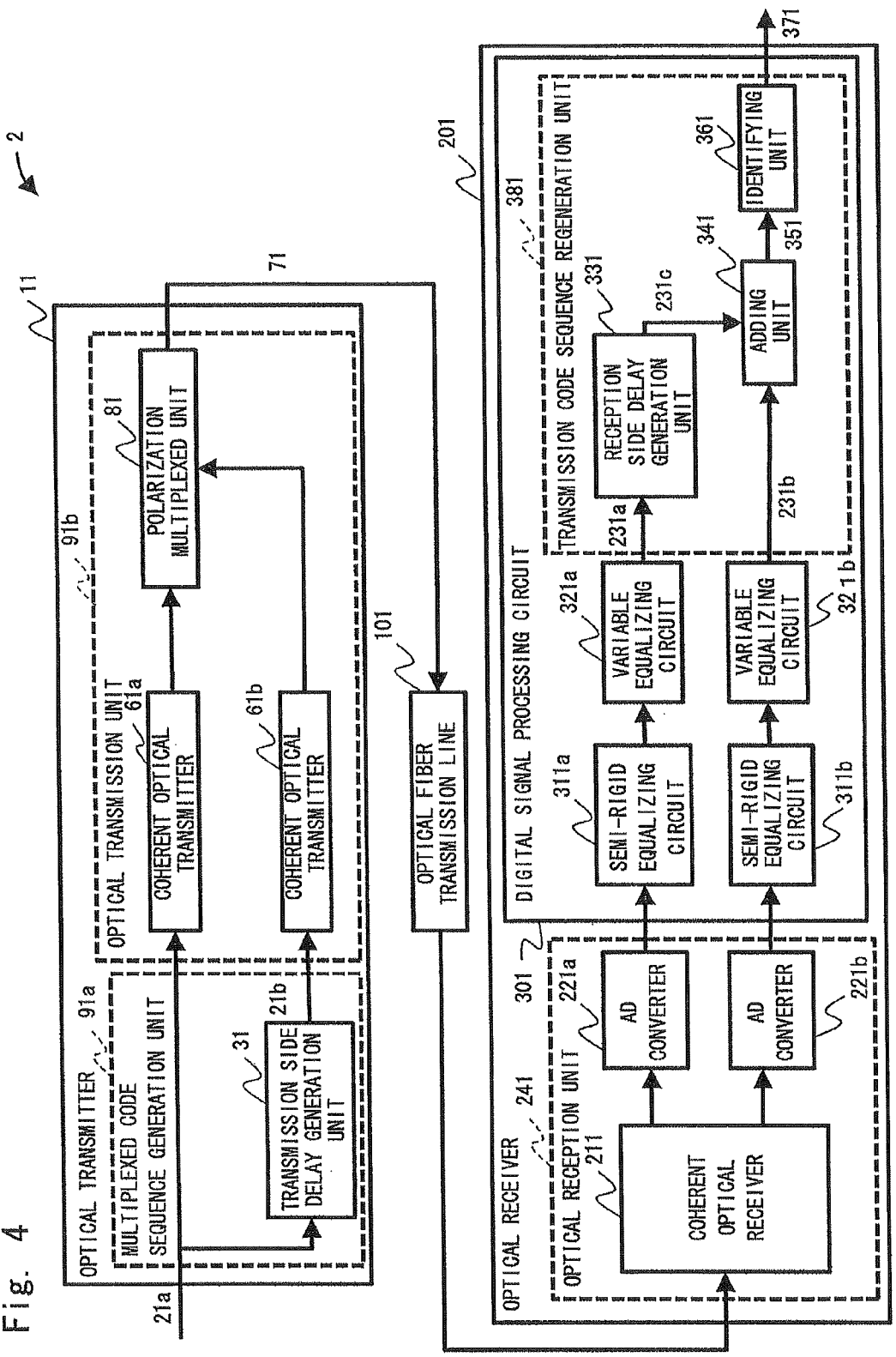
FIG. 4 illustrates a configuration of an optical transmission and reception system according to a second exemplary embodiment.

FIG. 4 illustrates a configuration of an optical transmission and reception system 2. The optical transmission and reception system 2 includes an optical transmitter 11, an optical fiber transmission line 101 and an optical receiver 201.

The optical transmitter 11 includes a multiplexed code sequence generation unit 91a and an optical transmission unit 91b.

The multiplexed code sequence generation unit 91a includes a transmission side delay generation unit 31.

The transmission side delay generation unit 31 is a transmission code sequence generation unit arranged to generate a new transmission code sequence by adding a bit delay to a code sequence inputted thereto. The transmission side delay generation unit 31 generates a second transmission code sequence 21b by adding an M bit delay (M is a natural number) to a first transmission code sequence 21a, and outputs the same to a coherent optical transmitter 61b.

The optical transmission unit 91b includes a coherent optical transmitter 61a, the coherent optical transmitter 61b, and a polarization multiplexed unit 81.

The coherent optical transmitter 61a is a coherent optical transmitter for X polarization arranged to convert a code sequence inputted thereto into an X polarized light signal, and transmits the same. To be more specific, the coherent optical transmitter 61a converts a code, which is included in the first transmission code sequence 21a inputted thereto, into an X polarized light signal 71a, and outputs the same to the polarization multiplexed unit 81.

The coherent optical transmitter 61b is a coherent optical transmitter for Y polarization arranged to convert a code sequence inputted thereto in a Y polarized light signal, and transmits the same. To be more specific, the coherent optical transmitter 61b converts a code, which is included in the second transmission code sequence 21b inputted thereto from the transmission side delay generation unit 31, into a Y polarized light signal 71b, and outputs the same to polarization multiplexing unit 81.

The polarization multiplexing unit 81 polarization-multiplexes the X polarized light signal 71a and the Y polarized light signal 71b in order to generate a light signal 71, and transmits the same to the optical receiver 201 via the optical fiber transmission line 101.

The optical fiber transmission line 101 is a transmission path for the light signal 71 which is outputted from the polarization multiplexing unit 81 and received by the optical receiver 201.

The optical receiver 201 includes an optical reception unit 241 and a digital signal processing circuit 301. The optical receiver 201 is a receiving apparatus utilizing a polarization diversity coherent optical reception method.

The optical reception unit 241 includes a coherent optical receiver 211, an AD converter 221a and an AD converter 221b.

The coherent optical receiver 211 converts the light signal 71, received from the polarization multiplexing unit 81, into an electrical signal by splitting the light signal 71 into two polarization components substantially orthogonal to one another, wherein one component is outputted to the AD converter 221a and the other component is outputted to the AD converter 221b. Note that the electrical signal generated by the coherent optical receiver 211 is an analogue signal.

The AD converters 221a and 221b each convert the electrical signal, which is an analogue signal inputted thereto from the coherent optical receiver 211, into a digital signal. The AD converter 211a outputs the generated digital signal to the semi-rigid equalizing circuit 311a of the digital signal processing circuit 301. The AD converter 221b outputs the generated digital signal to the semi-rigid equalizing circuit 311b of the digital signal processing circuit 301.

The digital signal processing circuit 301 includes the semi-rigid equalizing circuit 311a, the semi-rigid equalizing circuit 311b, a variable equalizing circuit 321a, a variable equalizing circuit 321b and a transmission code sequence regeneration unit 381.

The semi-rigid equalizing circuits 311a and 311b each compensate for chromatic dispersion which may affect the light signal 71 when the same is transmitted via the optical fiber transmission line 101. The semi-rigid equalizing circuit 311a compensates the digital signal, inputted thereto from the AD converter 221a, and outputs the same to the variable equalizing circuit 321a. The semi-rigid equalizing circuit 311b compensates the digital signal, inputted thereto from the AD converter 221b, and outputs the same to the variable equalizing circuit 321b.

The variable equalizing circuits 321a and 321b each compensate for the polarization dispersion, and separate the X polarization component and the Y polarization. The variable equalizing circuit 321a compensates the signal, which is inputted thereto from the semi-rigid equalizing circuit 311a, for polarization dispersion, generates a first received signal 231a which is separated into the X polarization component, and outputs the same to a reception side delay generation unit 331. The variable equalizing circuit 321b compensates the signal, which is inputted thereto from the semi-rigid equalizing circuit 311b, for polarization dispersion, generates a second received signal 231b which is separated into the Y polarization component, and outputs the same to an adding unit 341.

The transmission code sequence regeneration unit 381 includes the reception side delay generation unit 331, the adding unit 341 and an identifying unit 361.

The reception side delay generation unit 331 is a circuit arranged to add a delay to a signal inputted thereto. To be more specific, the reception side delay generation unit 331 adds an N bit delay to the first received signal 231a, which is inputted thereto from the variable equalizing circuit 321a, in order to generate a delayed received signal. Here, the delayed received signal will be referred to as a third received signal 231c. The reception side delay generation unit 331 outputs the third received signal 231c to the adding unit 341.

The adding unit 341 adds the two signals inputted thereto. To be more specific, the adding unit 341 adds the second received signal 231b, inputted thereto from the variable equalizing circuit 321b, and the third received signal 231c, inputted thereto from the reception side delay generation unit 331, in order to generate a sum signal 351. The adding unit 341 outputs the sum signal 351 to the identifying unit 361.

The identifying unit 361 identifies, out of the sum signal 351 inputted thereto from the adding unit 341, bits of codes, which are generated by adding the same codes, and outputs the identified bits of codes as a transmission code sequence 371.

Next, an operation of the optical transmission and reception system 2 will be described. Firstly, an operation of the optical transmitter 11, which is at a signal transmission side, will be described.

The first transmission code sequence 21a is split into two, and inputted, respectively, to the transmission side delay generation unit 31 and the coherent optical transmitter 61a of the optical transmitter 11. Note that codes included in the first transmission code sequence 21a are denoted as A0, B0, C0 and so forth.

The transmission side delay generation unit 31 generates the second transmission code sequence 21b by adding an M bit delay to the first transmission code sequence 21a, and outputs the same to the coherent optical transmitter 61b. Note that codes constituting the second transmission code sequence 21b are denoted as A1, B1, C1 and so forth. Further, note that the codes A0 and A1 are the same code, the codes B0 and B1 are the same code, and so are other codes included in the transmission code sequences.

The coherent optical transmitter 61a generates an X polarized light signal 71a based on the first transmission code sequence 21a, and outputs the same to the polarization multiplexing unit 81. For example, when a value of a code is 0, the coherent optical transmitter 61a outputs a waveform having an amplitude of 0; and when a value of a code is 1, the coherent optical transmitter 61a outputs a waveform having an amplitude of 1.

The coherent optical transmitter 61b generates a Y polarized light signal 71b based on the second transmission code sequence 21b inputted thereto from the transmission side delay generation unit 31, and outputs the same to the polarization multiplexing unit 81. For example, when a value of a code is 0, the coherent optical transmitter 61b outputs a waveform having an amplitude of 0; and when a value of a code is 1, the coherent optical transmitter 61b outputs a waveform having an amplitude of 1.

The polarization multiplexing unit 81 polarization-multiplexes the X polarized light signal 71a and the Y polarized light signal 71b in order to generate the light signal 71.

Figure 5:
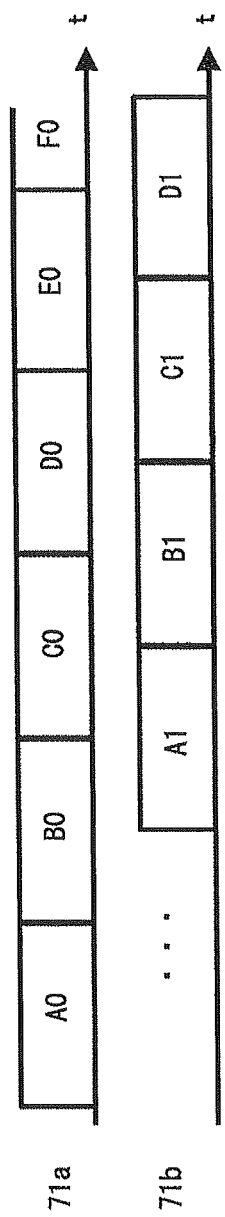
FIG. 5 illustrates a code sequence of an optical transmission and reception system according to a second exemplary embodiment.

FIG. 5 is a schematic view illustrating the X polarized light signal 71a and the Y polarized light signal 71b which are inputted to the polarization multiplexing unit 81. The codes A0, B0, C0 and so forth of the X polarized light signal 71a are each 1 bit, while the codes A1, B1, C0 and so forth of the Y polarized light signal 71b are each 1 bit. Due to the delay added by the transmission side delay generation unit 31, the Y polarized light signal 71b is delayed by 1.5 bit with respect to the X polarized light signal 71a. The polarization-multiplexing unit 81 transmits the light signal 71 to the optical receiver 201 via the optical fiber transmission line 101.

Next, an operation of the optical receiver 201, which is at a signal reception side, will be described.

The coherent optical receiver 211 converts the light signal 71, received from the polarization multiplexing unit 81, into an analogue signal by splitting the light signal 71 into two polarization components substantially orthogonal to one another, wherein one component is outputted to the AD converter 221a and the other component is outputted to the AD converter 221b.

The AD converter 221a converts the analogue signal, inputted thereto from the coherent optical receiver 211, into a digital signal, and outputs the same to the semi-rigid equalizing circuit 311a.

The AD converter 221b converts the analogue signal, inputted thereto from the coherent optical receiver 211, into a digital signal, and outputs the same to the semi-rigid equalizing circuit 311b.

Here, assuming that noise, whose amplitude is as large as 5, is added at the optical fiber transmission line 100, the amplitude of the waveform indicating 0 will have the amplitude of between 0 to 5, and the waveform indicating 1 will have the amplitude of between 5 to 15. For example, the AD converters 221a and 221b each quantize the value of the amplitude of an analogue signal into a 16-degree scale (of 0 through 15).

The semi-rigid equalizing circuit 311a compensates the signal, inputted thereto from the AD converter 221a, such that the signal is in a state uninfluenced by chromatic dispersion as the signal was when the same was transmitted via the optical fiber transmission line 101. The semi-rigid equalizing circuit 311a outputs the compensated signal to the variable equalizing circuit 321a.

The semi-rigid equalizing circuit 311b compensates the signal, inputted thereto from the AD converter 221b, such that the signal is in a state uninfluenced by chromatic dispersion as the signal was when the same was transmitted via the optical fiber transmission line 101. The semi-rigid equalizing circuit 311b outputs the compensated signal to the variable equalizing circuit 321b.

The variable equalizing circuit 321 generates the first received signal 231a by compensating the signal, which is inputted thereto from the semi-rigid equalizing circuit 311a, for polarization fluctuation and polarization dispersion, and outputs the same to the reception side delay generation unit 331.

The variable equalizing circuit 321 generates the second received signal 231b by compensating the signal, which is inputted thereto from the semi-rigid equalizing circuit 311b, for polarization fluctuation and polarization dispersion, and outputs the same to the adding unit 341.

The reception side delay generation unit 331 generates the third received signal 231c by adding an N bit delay to the first received signal 231a inputted thereto from the variable equalizing circuit 321a, and outputs the same to the adding unit 341. To be more specific, the reception side delay generation unit 331 generates the third received signal 231c by adding a 1.5 bit delay to the first received signal 231a since the delay added to the second transmission code sequence 21b at the transmission side delay generation unit 31 of the optical transmitter 11 is 1.5 bit.

The adding unit 341 adds the two signals inputted thereto. To be more specific, the adding unit 341 generates the sum signal 351 by adding the second received signal 231b, which is inputted thereto from the variable equalizing circuit 321b, and the third received signal 231c, which is inputted thereto from the reception side delay generation unit 331, and outputs the same to the identifying unit 361.

Figure 6:
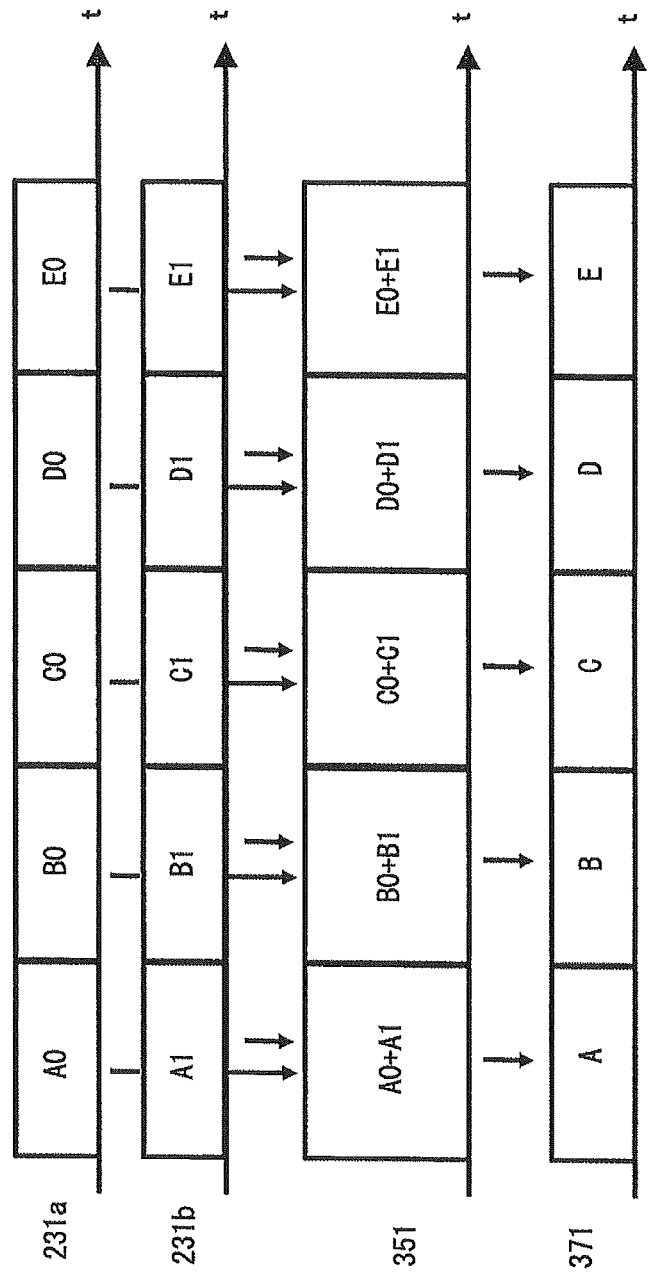
FIG. 6 illustrates a code sequence of an optical transmission and reception system according to a second exemplary embodiment.

Here, FIG. 6 illustrates a schematic view of the sum signal 351 being generated from the second received signal 231b and the third received signal 231c, and the transmission code sequence 371 being generated. To be more specific, the reception side delay generation unit 331 generates the third received signal 231c by adding a 1.5 bit delay to the first received signal 231a. By virtue of this process, the adding unit 341 is able to add the codes each having a same element from the second received signal 231b and the third received signal 231c. In other word, since an element of the third received signal 231c in an interval between t11 and t12 is A0, and an element of the second received signal 231b in the interval between t11 and t12 is A1, the adding unit 341 generates sum signal A0+A1. Further, in an interval between t12 and t13, an element of the third received signal 231c is B0, and an element of the second received signal 231b is B1, and thus, the adding unit 341 generates a sum signal B0+B1. The same process is applied to other elements of the respective signals.

The identifying unit 361 identifies the sum signal 351, which is inputted thereto from the adding unit 341, and outputs the transmission code sequence 371. For example, in FIG. 6, the identifying unit 361 generates a code A from an A0 and A1 of the sum signal 351. Then, the identifying unit 361 outputs the generated code A as the transmission code sequence 371. The same process is applied to other codes as well.

Here, for example, when a quantized amplitude value of the code B0 is 8 and a quantized amplitude value of the code B1 is 11, B1 and B0 make 19. Based on an operation of the AD converters 221a and 221b, since an amplitude of a waveform, when a code indicates 1, is between 5 through 15, by adding the amplitudes of B0 and B1, 10 through 30 will be the value indicating 1. Therefore, when B0 and B1 make 19, the identifying unit 361 generates the transmission code sequence 371 treating the code B as 1. In a similar manner, since an amplitude of a waveform, when a code indicates 0, is between 0 through 10, by adding the two of the quantized values, 0 through 10 will be the value indicating 0. For example, when C0 and C1 make 6, the identifying unit 361 generates the transmission code sequence 371 treating the code C as 0.

Thus, according to the digital coherent optical transmission method utilizing an orthogonal polarization method, it becomes possible to duplicate a transmission code sequence at the transmission side, and transmit two polarized waves in a duplicated manner where one wave is time shifted from the other wave. Since the baud rate of the transmission signal is doubled, compared with the reception sensitivity of a non-duplicated transmission signal, the reception sensitivity of the transmission may be decreased by 3 dB. However, according to the present system, since the received signal utilizing the two polarized waves is put through after the identification process after the adding process of the two polarized waves is performed at the reception side, the reception sensitivity is improved by 3 dB. Thus, the present system allows the same level of reception sensitivity as when a non-duplicated transmission signal were to be transmitted.

Further, according to the present exemplary embodiment of the present invention, since an original transmission code sequence is shifted in terms of time and polarization with respect to a duplicated transmission code sequence, various types of deterioration, such as the influence of non-linear effect due to an adjacent channel, or the like, which may occur with time in the optical fiber transmission line can be dispersed.

Third Exemplary Embodiment

Figure 7:
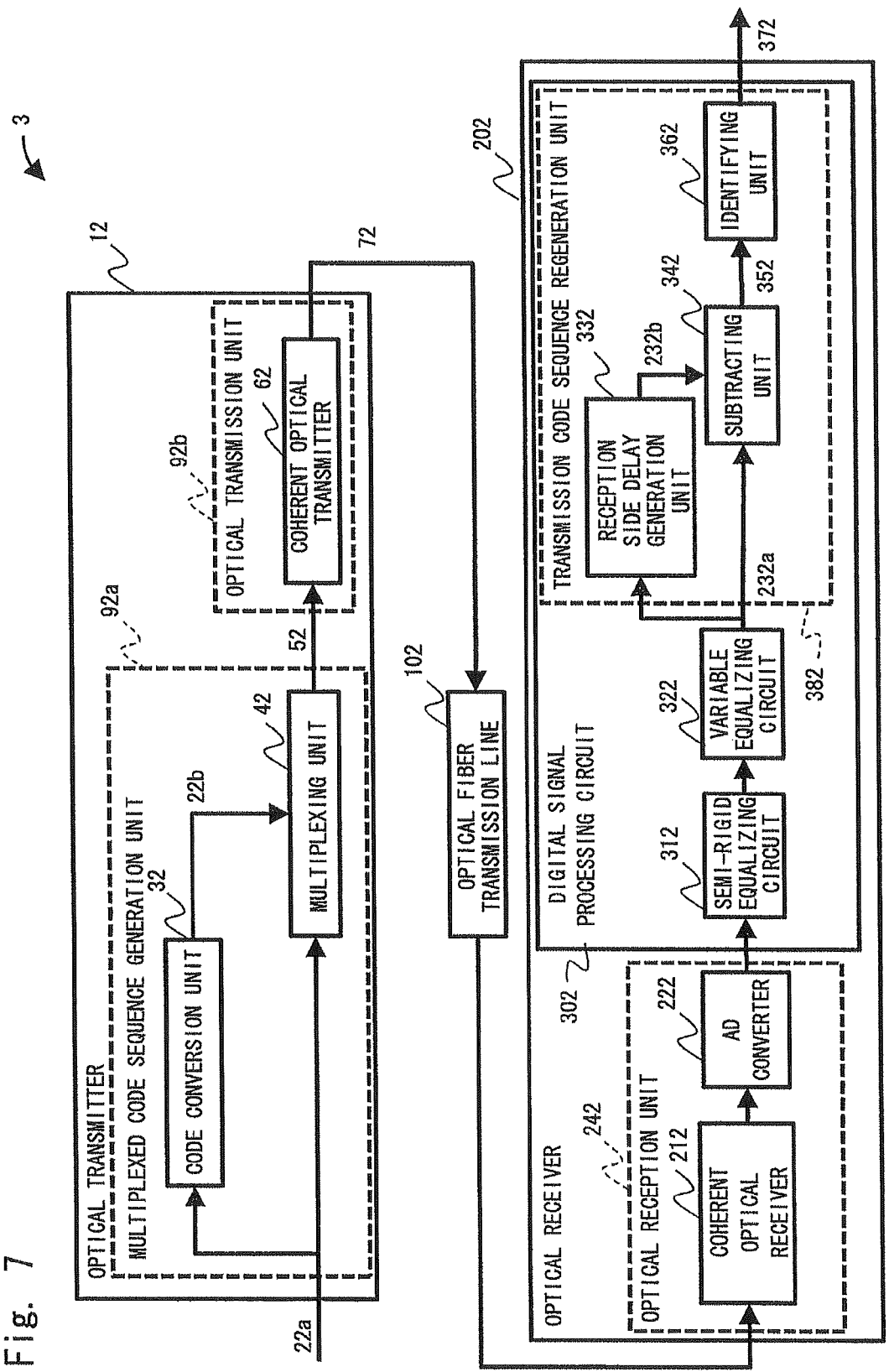
FIG. 7 illustrates a configuration of an optical transmission and reception system according to a third exemplary embodiment.

FIG. 7 illustrates a configuration of an optical transmission and reception system 3. The optical transmission and reception system includes an optical transmitter 12, an optical fiber transmission line 102 and an optical receiver 202.

The optical transmitter 12 includes a multiplexed code sequence generation unit 92a and an optical transmission unit 92b.

The multiplexed code sequence generation unit 92a includes a code conversion unit 32 and a multiplexing unit 42.

Figure 8:
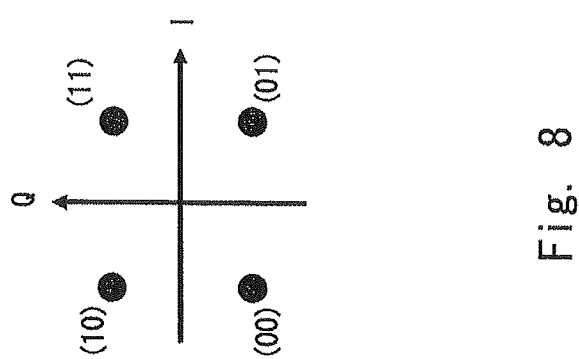
FIG. 8 is a constellation diagram mapping a transmission code under QPSK modulation protocol.

The code conversion unit 32 is a transmission code sequence generation unit arranged to generate a new transmission code sequence by converting a transmission code sequence, which is inputted thereto, into a complementary code. FIG. 8 is a constellation diagram mapping a transmission code under QPSK modulation protocol. According to QPSK modulation protocol, two bits of codes are simultaneously transmitted as a pair in one time slot. Codes which are positioned symmetrically with respect to I and Q axes, namely (00) and (11), and (10) and (01), are complementary to one another, wherein corresponding modulation signals are shifted from one another by an n phase.

The code conversion unit 32 generates the second transmission code sequence 22b from the first transmission code sequence 22a, which is inputted into the optical transmitter 12, and outputs the second transmission code sequence 22b to the multiplexing unit 42. The second transmission code sequence 22b is a complementary code sequence to the first transmission code sequence 22a.

The multiplexing unit 42 is a circuit arranged to multiplex the two code sequences inputted thereto. To be more specific, the multiplexing unit 42 multiplexes the first transmission code sequence 22a and the second transmission code sequence 22b, which is inputted thereto from the code conversion unit 32, in order to generate a multiplexed code sequence 52. The multiplexing unit 42 outputs the multiplexed code sequence 52 to a coherent optical transmitter 62.

The optical transmission unit 92b includes the coherent optical transmitter 62.

The coherent optical transmitter 62 converts the multiplexed code sequence 52 into the light signal 72, and transmits the light signal 72 to the optical receiver 202 via the optical fiber transmission line 102.

The optical fiber transmission line 102 is transmission path for the light signal 72, which is outputted from the coherent optical transmitter 62 and received by the optical receiver 202.

The optical receiver 202 includes an optical reception unit 242 and a digital signal processing circuit 302.

The optical reception unit 242 includes a coherent optical receiver 212 and an AD converter 222.

The coherent optical receiver 212 converts the light signal 72, which is received from the coherent optical transmitter 62, into an electrical signal, and outputs the electrical signal to the AD converter 222. Here, the electrical signal generated by the coherent optical receiver 212 is an analogue signal.

The AD converter 222 converts the electrical signal, which is the analogue signal inputted thereto from the coherent optical receiver 212, into a digital signal. The AD converter 222 outputs the generated digital signal to the digital signal processing circuit 302.

The digital signal processing circuit 302 includes a semi-rigid equalizing circuit 312, a variable equalizing circuit 322, and a transmission code sequence regeneration unit 382.

The semi-rigid equalizing circuit 312 compensates for chromatic dispersion which may be generated when the light signal 72 is transmitted via the optical fiber transmission line 102. To be more specific, the semi-rigid equalizing circuit 312 compensate a signal, which is inputted from the AD converter 222, such that the signal is in a state unaffected by chromatic dispersion. The semi-rigid equalizing circuit 312 outputs the compensated signal to the variable equalizing circuit 322.

The variable equalizing circuit 322 compensates for polarization fluctuation and chromatic dispersion. To be more specific, the variable equalizing circuit 322 generates a first received signal 232a by compensating the signal, which is inputted thereto from the semi-rigid equalizing circuit 312, for polarization fluctuation and polarization dispersion, and outputs the first received signal 232a to a reception side delay generation unit 332 and a subtracting unit 342.

The transmission code sequence regeneration unit 382 includes the reception side delay generation unit 332, the subtracting unit 342 and an identifying unit 362.

The reception side delay generation unit 332 is a circuit arranged to add a delay to a signal inputted thereto. To be more specific, the reception side delay generation unit 332 generates a delayed received signal by adding a 2 time slot's worth of delay to the first received signal 232a, which is inputted thereto from the variable equalizing circuit 322. Here, the delayed received signal will be referred to as a second received signal 232b. The reception side delay generation unit 332 outputs the second received signal 232b to the subtracting unit 342.

The subtracting unit 342 performs subtraction with the two signals inputted thereto. To be more specific, the subtracting unit 342 performs subtraction on the first received signal 232a, inputted from the variable equalizing circuit 322, and the second received signal 232b, inputted from the reception side delay generation unit 332, in order to generate a differential signal 352. The subtracting unit 342 outputs the differential signal 352 to the identifying unit 362.

The identifying unit 362 identifies bits of codes, which are generated by subtracting the same codes, out of the differential signal 352, which is inputted thereto from the subtracting unit 342, and outputs the identified bits of codes as a transmission code sequence 372.

Next, an operation of an optical transmission and reception system 3 will be described. Firstly, an operation of the optical transmitter 12, which is at a signal transmission side, will be described.

The first transmission code sequence 22a is split into two, and inputted, respectively, into the code conversion unit 32 and the multiplexing unit 42 at the optical transmitter 12.

Figure 9:
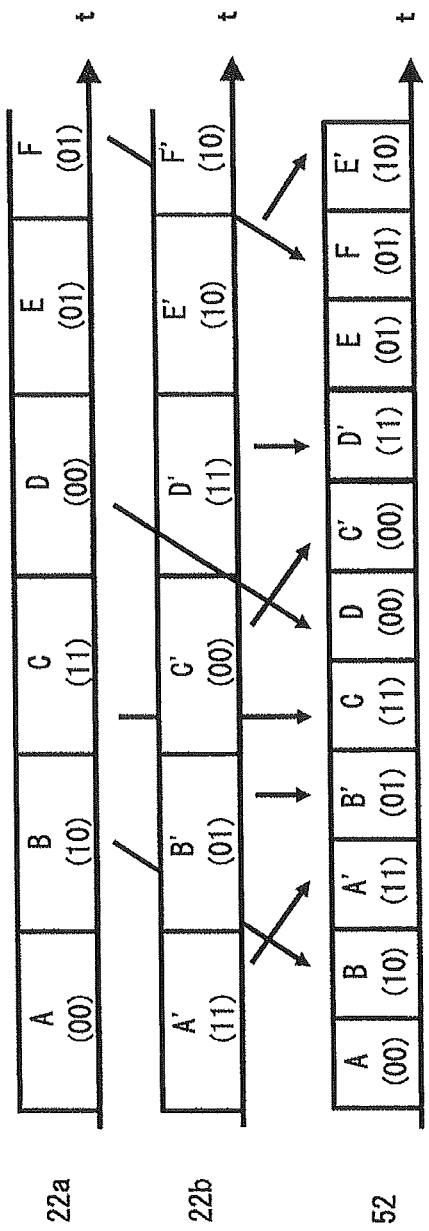
FIG. 9 illustrates a code sequence of an optical transmission and reception system according to a third exemplary embodiment.

The code conversion unit 32 generates the second transmission code sequence 22b by performing a code conversion to the first transmission code sequence 22a, and outputs the second transmission code sequence 22b to the multiplexing unit 42. FIG. 9 illustrates a schematic view of the multiplexed code sequence 52 being generated from the first transmission code sequence 22a and the second transmission code sequence 22b. Note that when the first transmission code sequence 22a includes codes, for example, A (00), B (10), C (11), D (00), E (01), and so for the, the second transmission code sequence 22b includes codes A' (11), B' (01), C' (00), D' (11), E' (10), and so forth.

The multiplexing unit 42 generates the multiplexed code sequence 52 by multiplexing the first transmission code sequence 22a and the second transmission code sequence 22b, and outputs the multiplexed code sequence 52 to the coherent optical transmitter 62. To be more specific, the first transmission code sequence 22a and the second transmission code sequence 22b are multiplexed alternately at the multiplexing unit 42 so that the multiplexed code sequence 52 includes A (00), B (10), A' (11), B' (01), C (11), D(00), C' (00), D' (11), E (01), F (01), E'(10), and so forth.

The coherent optical transmitter 62 converts the multiplexed code sequence 52 into a QPSK modulated light signal 72, and transmits the converted signal to the optical receiver 202 via the optical fiber transmission line 102.

Next, an operation of the optical receiver 202, which is at a signal receiving side, will be described.

The coherent optical receiver 212 converts the light signal 72, which is inputted thereto from the coherent optical transmitter 62, into an analogue signal, and outputs the converted signal to the AD converter 222.

The AD converter 222 converts the analogue signal, which is inputted thereto from the coherent optical receiver 212, into a digital signal, and outputs the converted signal to the semi-rigid equalizing circuit 312.

The semi-rigid equalizing circuit 312 compensates the signal, which is inputted thereto from the AD converter 222, such that the signal is in a state unaffected by chromatic dispersion, as the signal was when the same was transmitted via the optical fiber transmission line 102. The semi-rigid equalizing circuit 312 outputs the compensated signal to the variable equalizing circuit 322.

The variable equalizing circuit 322 generates the first received signal 232a by compensating the signal, which is inputted thereto from the semi-rigid equalizing circuit 312, for polarization fluctuation and polarization dispersion, and outputs the first received signal 232a to the reception side delay generation unit 332 and the subtracting unit 342.

The reception side delay generation unit 332 generates the second received signal 232b by adding a 2 time slot's worth of delay to the first received signal 232a, which is inputted thereto from the variable equalizing circuit 322, and outputs the second received signal 232b to the subtracting unit 342.

The subtracting unit 342 performs subtraction with the two signals inputted thereto. To be more specific, the subtracting unit 342 performs subtraction on the first received signal 232a, inputted from the variable equalizing circuit 322, and the second received signal 232b, inputted from the reception side delay generation unit 332, in order to generate the difference signal 352, and outputs the difference signal 352 to the identifying unit 362.

Figure 10:
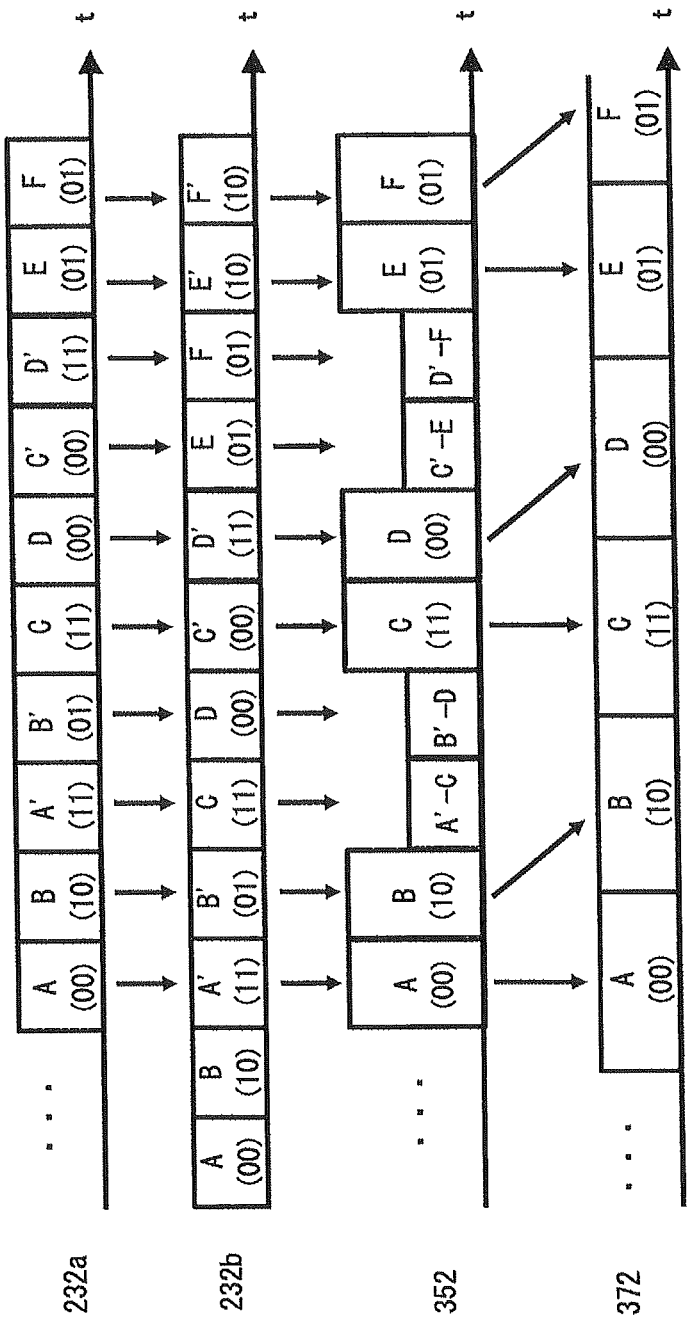
FIG. 10 illustrates a code sequence of an optical transmission and reception system according to a third exemplary embodiment.

FIG. 10 illustrates a schematic view of the differential signal 352 being generated from the first received signal 232a and the second received signal 232b, and the transmission code sequence 372 being generated.

The subtracting unit 342 subtracts A', B', C', D', E' and F' of the first received signal 232a from time slots of A, B, C, D, E and F of the second received signal 232b. Since both of the signals are complementary to one another, and are phase shifted only by it, a signal having twice the amplitude for A, B, C, D, E and F will be obtained after the subtraction. In contrast, the subtracting unit 342 subtracts C, D, E and F of the first received signal 232a from time slots of A', B', C' and D', which are uncorrelated to one another, leaving the differential signal 352 having a random signal of A'-C, B'-D, C'-E, D'-F.

The identifying unit 362 performs signal identification with respect to time slots A, B, C, D, E and F of the differential signal 352, and outputs the transmission code sequence 372. For example, the identifying unit 362 extracts signals from the differential signal 352 by performing a serial/parallel conversion clocked at a specific frequency f0, and reading out at a timing of f0/2.

As described above, according to the digital coherent optical transmission method, it becomes possible to duplicate a transmission code sequence which is complementary to an original signal at the transmission side, and transmit the same in a duplicated manner where one sequence is time shifted from the other sequence. Since the code rate of the transmission signal is twice the original code rate of the transmission code sequence, the reception sensitivity may be decreased by 3 dB. However, since the identification process is carried out at the receiving side after the subtraction process with the two sequences which are complimentary to one another is carried out, the amplitude will be doubled thereby improving the reception sensitivity by 3 dB. Thus, the present system allows, as a whole, the same level of reception sensitivity as when the original transmission code sequence were to be transmitted.

Further, according to the present exemplary embodiment of the invention, since the original transmission code sequence and the duplicated transmission code sequence are transmitted in a time shifted and multiplexed manner with respect to one another, various types of deterioration, such as the influence of non-linear effect due to an adjacent channel, or the like, which may occur with time in the optical fiber transmission line can be dispersed. That is to say, according to the present exemplary embodiment of the present invention, the transmission performance of the communication utilizing an optical transmission path is improved.

Note that the present invention is not limited to the embodiments described above, and may be modified by those skilled in the art without departing from the scope of the invention. For example, in the exemplary embodiment 2, the polarized signal to which the delay is added in the optical transmitter 11 may be the X polarized light signal or the Y polarized light signal. It is to be noted that the signal to which the delay is added in the optical receiver 201 needs to change in accordance with the direction of polarization to which the delay is added in the optical transmitter 11.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical transmission system, comprising:
   an optical transmitter arranged to convert a transmission code sequence to a light signal and transmit the light signal; and
   an optical receiver arranged to receive the light signal and generate the transmission code sequence,
   wherein the optical transmitter includes:
      a multiplexed code sequence generation unit that generates a multiplexed code sequence by multiplexing each code included in the transmission code sequence, the code which is not converted or converted by a predetermined conversion rule temporally separately appearing multiple times in the multiplexed code sequence; and
      an optical transmission unit arranged to convert the multiplexed code sequence generated at the multiplexed code sequence generation unit into the light signal and transmit the light signal,
   wherein the optical receiver includes:
      an optical reception unit arranged to receive and convert the light signal transmitted from the optical transmitter into a code sequence; and
      a transmission code sequence regeneration unit arranged to regenerate the transmission code sequence by identifying a code based on a value of a plurality of codes each corresponding to one another included in the code sequence converted by the optical reception unit, and
   wherein the transmission code sequence regeneration unit identifies the code, based on a value of a code included in the code sequence converted by the optical reception unit, and a value of a code, included in a delayed code sequence generated by adding a delay to the code sequence allowing a plurality of codes each corresponding to one another to have a same timing.

2. The optical transmission system according to claim 1, wherein the multiplexed code sequence generation unit includes:
   a delayed code sequence generation unit that generates a delayed code sequence by adding a predetermined amount of delay to the transmission code sequence; and
   a multiplexed code sequence generation unit that generates the multiplexed code sequence by performing a time division multiplexing on a code extracted from the delayed code sequence and a code extracted from the transmission code sequence in an alternate manner.

3. An optical transmission system, comprising:
   an optical transmitter arranged to convert a transmission code sequence to a light signal and transmit the light signal; and
   an optical receiver arranged to receive the light signal and generate the transmission code sequence,
   wherein the optical transmitter includes:
      a multiplexed code sequence generation unit that generates a multiplexed code sequence by multiplexing each code included in the transmission code sequence, the code which is not converted or converted by a predetermined conversion rule temporally separately appearing multiple times in the multiplexed code sequence; and
an optical transmission unit arranged to convert the multiplexed code sequence generated at the multiplexed code sequence generation unit into the light signal and transmit the light signal, wherein the optical receiver includes:
an optical reception unit arranged to receive and convert the light signal transmitted from the optical transmitter into a code sequence; and
a transmission code sequence regeneration unit arranged to regenerate the transmission code sequence by identifying a code based on a value of a plurality of codes each corresponding to one another included in the code sequence converted by the optical reception unit, wherein the multiplexed code sequence generation unit includes:
a delayed code sequence generation unit generates a delayed code sequence by adding a predetermined amount of delay to the transmission code sequence; and
an output unit that outputs the transmission code sequence and the delayed code sequence, wherein the optical transmission unit includes:
a first light signal converting unit that converts the transmission code sequence into a first polarized light signal;
a second light signal converting unit that converts the transmission code sequence into a second polarized light signal; and
a multiplexing unit that polarization multiplexes the first polarized light signal and the second polarized light signal, wherein the optical reception unit includes:
a converting unit that converts the light signal, transmitted thereto from the optical transmitter, into the transmission code sequence and the delayed code sequence, and wherein the transmission code sequence regeneration unit includes:
a code sequence delay unit that adds a delay to the code sequence in accordance with the delay added at the multiplexed code sequence generation unit; and
a first identifying unit that identifies a code based on a value of a code included in the transmission code sequence and a value of a code of the delayed code sequence corresponding thereto.

4. The optical transmission system according to claim 1, wherein the transmission code sequence regeneration unit adds a value of a code with another value of a code corresponding thereto of a plurality of codes, and identifies a code by comparing an added value with a threshold.

5. An optical transmission system, comprising:
an optical transmitter arranged to convert a transmission code sequence to a light signal and transmit the light signal; and
an optical receiver arranged to receive the light signal and generate the transmission code sequence, wherein the optical transmitter includes:
a multiplexed code sequence generation unit that generates a multiplexed code sequence by multiplexing each code included in the transmission code sequence, the code which is not converted or converted by a predetermined conversion rule temporally separately appearing multiple times in the multiplexed code sequence; and
an optical transmission unit arranged to convert the multiplexed code sequence generated at the multiplexed code sequence generation unit into the light signal and transmit the light signal, wherein the optical receiver includes:
an optical reception unit arranged to receive and convert the light signal transmitted from the optical transmitter into a code sequence; and
a transmission code sequence regeneration unit arranged to regenerate the transmission code sequence by identifying a code based on a value of a plurality of codes each corresponding to one another included in the code sequence converted by the optical reception unit, wherein the multiplexed code sequence generation unit includes:
a code sequence generation unit that generates a first transmission code sequence including a plurality of first time slots each comprised of a two bit code included in the transmission code sequence, and a second transmission code sequence including a plurality of second time slots each comprised of a code complimentary to the two bit code included in the first time slot; and
a multiplexing unit that multiplexes by arranging two of the first time slots extracted from the first transmission code sequence and two of the second time slots extracted from the second transmission code sequence in an alternate manner, wherein the optical transmission unit decides a phase in accordance with the two bit code included in the first time slot and the second time slot, and modulates the two bit codes using a QPSK modulation method to convert the two bit codes into the light signal, wherein the optical reception unit includes:
a demodulating unit that demodulates the light signal transmitted thereto from the optical transmitter to convert the light signal into a code sequence, and wherein the transmission code sequence regeneration unit includes:
a code sequence delay unit that adds a delay to the code sequence by a predetermined amount; and
a second identifying unit that identifies a code based on a value of a code included in the transmission code sequence and a value of a complimentary code corresponding to the delayed code sequence.

6. The optical transmission system according to claim 5, wherein the transmission code sequence regeneration unit includes:
a subtracting unit that subtracts a value of a code included in the code sequence, and a value of a complimentary code corresponding to a delayed code sequence; and
a third identifying unit that identifies a code based on a result of the subtraction.

7. The optical transmission system according to claim 1 wherein the light signal comprises a coherent light.

8. An optical transmission method, comprising:
transmitting a light signal after converting a transmission code sequence into the light signal; and
receiving the light signal and generating the transmission code sequence, wherein the transmitting includes:
generating a multiplexed code sequence by multiplexing each code included in the transmission code sequence, the code which is not converted or converted by a predetermined conversion rule temporally separately appearing multiple times in the multiplexed code sequence; and converting the generated multiplexed code sequence into the light signal and transmitting the same,
wherein the reception includes:
receiving the transmitted light signal and converting the same into a code sequence; and
regenerating the transmission code sequence by identifying a code included in the converted code sequence based on a value of a plurality of codes each corresponding to another, and
wherein, in the regeneration the transmission code sequence, an identification is performed based on a value of a code included in the code sequence converted from the received light signal, and a value of a code, included in a delayed code sequence generated by adding a delay to the code sequence allowing a plurality of codes each corresponding to one another to have practically a same timing.

9. The optical transmission method according to claim 8, wherein the multiplexed code sequence generation includes:
generating a delayed code sequence by adding a predetermined delay to the transmission code sequence; and
generating a multiplexed code sequence by performing a time division multiplexing on a code extracted from the delayed code sequence and a code extracted from the transmission code sequence in an alternate manner.

10. An optical transmission method comprising:
transmitting a light signal after converting a transmission code sequence into the light signal; and
receiving the light signal and generating the transmission code sequence,
wherein the transmitting includes:
generating a multiplexed code sequence by multiplexing each code included in the transmission code sequence, the code which is not converted or converted by a predetermined conversion rule temporally separately appearing multiple times in the multiplexed code sequence; and
converting a generated multiplexed code sequence into the light signal and transmitting the same,
wherein the reception includes:
receiving the transmitted light signal and converting the same into a code sequence; and
regenerating the transmission code sequence by identifying a code included in the converted code sequence based on a value of a plurality of codes each corresponding to another,
wherein the generating the multiplexed code sequence includes:
generating a delayed code sequence by adding a predetermined delay to the transmission code sequence; and
outputting the transmission code sequence and the delayed code sequence,
wherein the transmitting includes:
converting the transmission code sequence into a first polarized light signal;
converting the delayed code sequence into a second polarized light signal; and
polarization multiplexing the first polarized light signal and the second polarized light signal,
wherein the receiving includes:
receiving the light signal transmitted thereto from the optical transmitter and converting the same into the transmission code sequence and the delayed code sequence;
adding a delay to the transmission code sequence in accordance with the delay added to generate the delay code sequence; and
identifying a code based on a value of a code included in the transmission code sequence and a value of a code of the delayed code sequence corresponding thereto.

11. The optical transmission method according to claim 8, wherein the regenerating the transmission code sequence adds a value of a code with another value of a code corresponding thereto of a plurality of codes, and identifies a code by comparing an added value and a threshold value.

12. An optical transmission method comprising:
transmitting a light signal after converting a transmission code sequence into the light signal; and
receiving the light signal and generating the transmission code sequence,
wherein the transmitting includes:
generating a multiplexed code sequence by multiplexing each code included in the transmission code sequence, the code which is not converted or converted by a predetermined conversion rule temporally separately appearing multiple times in the multiplexed code sequence; and
converting a generated multiplexed code sequence into the light signal and transmitting the same,
wherein the reception includes:
receiving the transmitted light signal and converting the same into a code sequence; and
regenerating the transmission code sequence by identifying a code included in the converted code sequence based on a value of a plurality of codes each corresponding to another,
wherein the generating the multiplexed code sequence includes:
generating a first transmission code sequence including a plurality of first time slots each comprised of a two bit code included in a transmission code, and a second transmission cod sequence including a plurality of second time slots each comprised of a code complimentary to the two bit code included in the first time slot; and
multiplexing by arranging two of the first time slots extracted from the first transmission code sequence and two of the second time slots extracted from the second transmission code sequence in an alternate manner,
wherein, in the transmitting, a phase is determined in accordance with the two bit code included in the first time slot and the second time slot, and the multiplexed code sequence is converted into the light signal by using a QPSK modulation method,
wherein, the receiving includes converting the light signal transmitted thereto from the optical transmitter into a code sequence by demodulation, and
wherein the regenerating the transmission code sequence includes:
adding a delay to the code sequence by a predetermined amount; and
identifying a code based on a value of a code included in the transmission code sequence and a value of a complimentary code corresponding to the delayed code sequence.

13. The optical transmission method according to claim 12 wherein the regenerating the transmission code sequence includes:

subtracting a value of a code included in the code sequence and a value of a complimentary code corresponding to a delayed code sequence; and identifying a code based on a result of the subtraction.

14. The optical transmission method according to claim 8 wherein the light signal comprises a coherent light.

* * * * *